United States Patent
Grossman et al.

(10) Patent No.: US 10,118,792 B2
(45) Date of Patent: Nov. 6, 2018

(54) FIBER UNWINDING SYSTEM AND METHODS OF UNWINDING A FIBER FROM A BOBBIN

(71) Applicant: General Electric Company, Schenectady, NY (US)

(72) Inventors: Theodore Robert Grossman, Cincinnati, OH (US); Roger Antonio Aparicio, Middletown, DE (US); Martin Peter Gill, Newark, DE (US); Steven Robert Hayashi, Niskayuna, NY (US); Andrew William Miller, Lincoln University, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/227,323

(22) Filed: Aug. 3, 2016

(65) Prior Publication Data

US 2018/0037433 A1 Feb. 8, 2018

(51) Int. Cl.
*B65H 49/18* (2006.01)
*B65H 59/00* (2006.01)
(Continued)

(52) U.S. Cl.
CPC .............. *B65H 49/18* (2013.01); *B05D 3/007* (2013.01); *B65H 49/26* (2013.01); *B65H 49/32* (2013.01); *B65H 49/34* (2013.01); *B65H 59/005* (2013.01); *B65H 59/04* (2013.01); *B65H 59/387* (2013.01); *B65H 75/4413* (2013.01); *C04B 35/62868* (2013.01); *C04B 35/657* (2013.01);
(Continued)

(58) Field of Classification Search
CPC ........ B65H 49/18; B65H 49/26; B65H 49/34; B65H 59/387; B65H 75/4413; B65H 54/2803
See application file for complete search history.

(56) References Cited

U.S. PATENT DOCUMENTS 5,263,112 A * 11/1993 Holt ................... B65H 49/18
250/227.11
6,580,813 B1 * 6/2003 Hermanns ............ B65H 67/062
242/118
(Continued)

FOREIGN PATENT DOCUMENTS

CN 102152474 A 8/2011
DE 3343285 A1 * 6/1985 ............ B65H 49/18
(Continued)

OTHER PUBLICATIONS

Machine Translation of JP 2005-262595 A, Sep. 29, 2005. (Year: 2005).*

*Primary Examiner* — William E Dondero
(74) *Attorney, Agent, or Firm* — General Electric Company; William Andes

(57) ABSTRACT

Unwinding systems and methods are provided for unwinding a fiber from a bobbin. The unwinding system can include an axle defining a first axis extending an axial direction, a bobbin rotatably mounted around the axle, a pulley positioned to receive the fiber from the bobbin, wherein the pulley is rotatable around a second axis, and a sensor positioned between the bobbin and the pulley. The bobbin is moveable along the axial direction, and wherein the fiber extends tangentially from a surface of the bobbin.

19 Claims, 4 Drawing Sheets

(51) Int. Cl.
  *B65H 49/32* (2006.01)
  *B65H 59/04* (2006.01)
  *B65H 75/44* (2006.01)
  *B65H 49/26* (2006.01)
  *B65H 59/38* (2006.01)
  *B65H 49/34* (2006.01)
  *D06M 13/53* (2006.01)
  *C04B 35/80* (2006.01)
  *C04B 35/657* (2006.01)
  *C04B 35/628* (2006.01)
  *B05D 3/00* (2006.01)

(52) U.S. Cl.
  CPC ........... *C04B 35/806* (2013.01); *D06M 13/53* (2013.01); *B65H 2701/31* (2013.01); *C04B 2235/3826* (2013.01); *C04B 2235/428* (2013.01); *C04B 2235/616* (2013.01)

(56) References Cited

U.S. PATENT DOCUMENTS

| | | | |
|---|---|---|---|
| 8,116,899 B1 * | 2/2012 | Johnson | B29C 70/56 19/240 |
| 8,403,251 B2 | 3/2013 | Uozumi et al. | |
| 2007/0099527 A1 | 5/2007 | Brun et al. | |
| 2011/0171399 A1 | 7/2011 | Brun et al. | |
| 2016/0229758 A1 * | 8/2016 | Kmetz | C04B 41/0018 |

FOREIGN PATENT DOCUMENTS

| | | | |
|---|---|---|---|
| DE | 4111732 A1 * | 10/1992 | B65H 49/18 |
| JP | 56009133 A * | 1/1981 | B32P 1/12 |
| JP | 58109227 A * | 6/1983 | B32P 1/12 |
| JP | 61124479 A * | 6/1986 | B65H 54/80 |
| JP | 03239420 A * | 10/1991 | B23H 7/10 |
| JP | 2781816 B3 * | 7/1998 | B65H 49/18 |
| JP | 2005262595 A * | 9/2005 | B65H 49/18 |
| WO | WO2015041899 A1 | 3/2015 | |

* cited by examiner

FIBER UNWINDING SYSTEM AND METHODS OF UNWINDING A FIBER FROM A BOBBIN

FIELD OF THE INVENTION

The described subject matter relates generally to composite materials and more specifically to methods for manufacturing composite materials.

BACKGROUND OF THE INVENTION

Due to high thermal and mechanical performance, coupled with relatively low density, numerous components could benefit from the use of Ceramic Matrix Composites (CMCs) in place of metals or intermetallics. During the manufacturing processes of CMC, the fibers need to be coated in order to survive the processes as well as for mechanical properties in service. Currently, two of the primary cost-effective methods of processing ceramic matrix composite (CMC) components are chemical vapor infiltration (CVI) and polymer infiltration and pyrolysis (PIP). Another process is glass transfer molding, which is faster than CVI and PIP, but is also much more expensive and resource intensive. Each of these processes uses a filament handling device using various forms of tension control on fiber movement during processing.

In the fiber coating process, fibers are typically unwound from a spindle to begin processing. During the unwind process, tension of the filaments is carefully controlled, since too much tension could destroy the filaments while not enough tension can allow the tow to jump off rollers and mis-track. In a fiber coating process, tension can also affect filament spacing which, in turn, can affect coating thickness uniformity and mechanical properties. In a conventional filament handling apparatus, the fiber bundles often break in midstream at any place along the fiber path length and breakage often occurs due to a failure in a process of unwinding the fiber bundles from fiber bundle feeding packages. The breakage of the fiber bundle typically occurs when friction exceeds the fiber strength or one or more of a plurality of single fibers of the fiber bundle is snarled or tangled at the time of unwinding process.

Thus, a need exists for an automated device that is constantly correcting, adjusting and maintaining the unwinding process of the tow during fiber processing.

BRIEF DESCRIPTION OF THE INVENTION

Aspects and advantages of the invention will be set forth in part in the following description, or may be obvious from the description, or may be learned through practice of the invention.

Unwinding systems and methods are generally provided for unwinding a fiber from a bobbin. In one embodiment, the unwinding system includes an axle defining a first axis extending an axial direction, a bobbin rotatably mounted around the axle, a pulley positioned to receive the fiber from the bobbin, wherein the pulley is rotatable around a second axis, and a sensor positioned between the bobbin and the pulley. Generally, the bobbin is moveable along the axial direction, and wherein the fiber extends tangentially from a surface of the bobbin.

In one embodiment, the method for unwinding a fiber from a bobbin generally includes unwinding a fiber from a bobbin rotating around a first axis extending an axial direction. The fiber is received into a pulley rotatable around a second axis, with the fiber extending a length from the bobbin to the pulley and defining a first angle with the first axis and a second angle with the second axis. The location of the fiber is sensed along at least one point of the length of the fiber between the bobbin and the pulley, and the bobbin is moved laterally along the axial direction such that the first angle is maintained between about 80° to about 100°.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
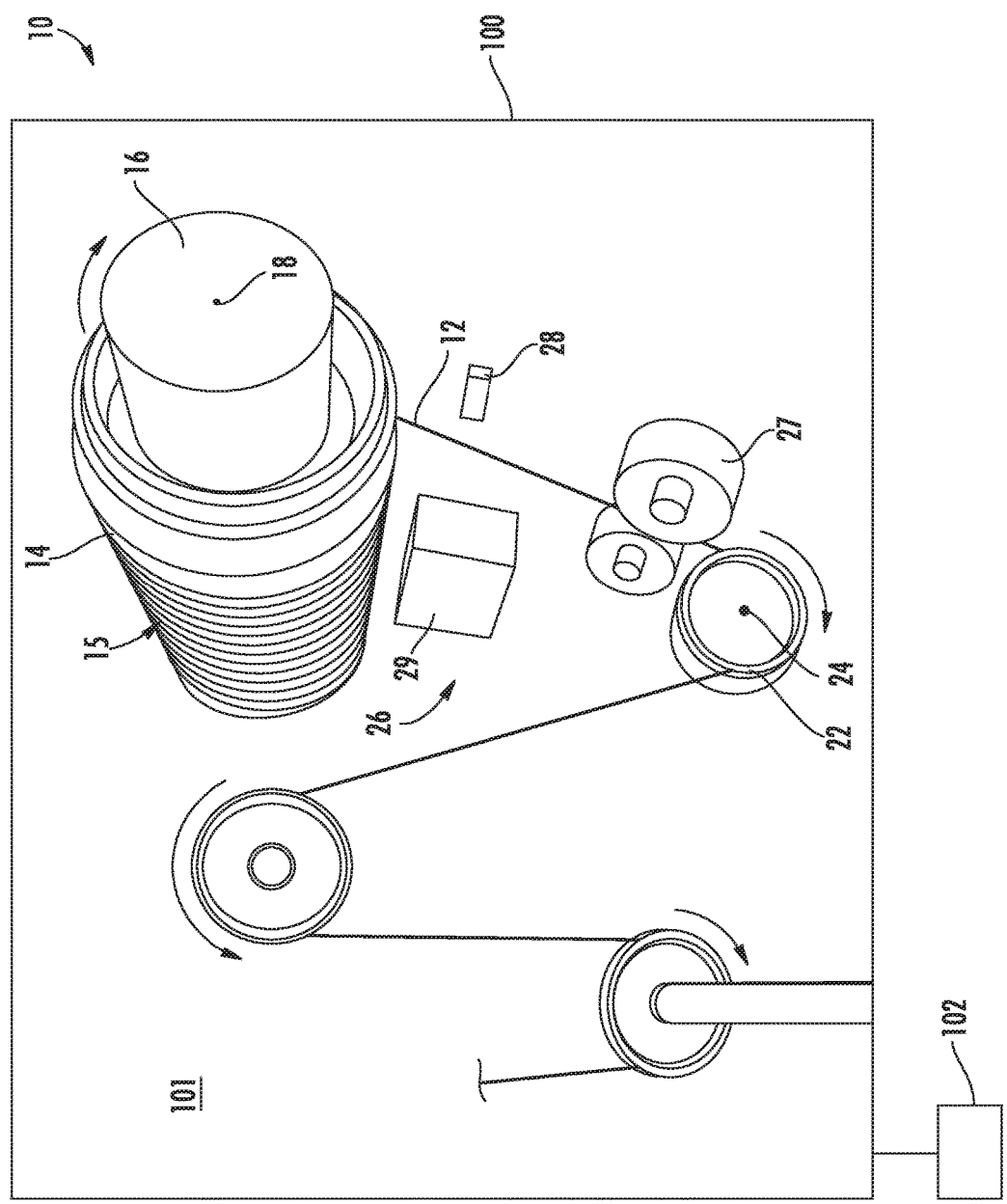
FIG. 1 shows a schematic of an exemplary unwinding system for unwinding a fiber from a bobbin.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

An intelligent unwind system is generally provided, along with methods of its use. In particular embodiments, a unwinding system uses at least one sensor (e.g., an optical sensor) to assess the fiber position, and a system of motors and/or drivers that align the fiber tow unwinding from the bobbin into the downstream receivers (e.g., a pulley) so as to minimize processing damage of the fiber as it leaves the surface of the wound fibers on the bobbin and enters the pulley. In particular, any scraping as the fiber unwinds from the bobbin, either with adjacent fibers on the bobbin and/or the bobbin surface, can be minimized by keeping the payoff angle (i.e., the first angle described below) near 90°. In one embodiment, the at least one sensor (e.g., a light sensor) is utilized to establish the position of the fiber as it is payed off of the bobbin. The bobbin can then be constantly aligned, in real-time, such that fiber is centered into the pulley. As such, the intelligent unwind system manages all aspects of the fiber handling, particularly when utilized within a vacuum chamber. The intelligent unwind system improves fiber quality, tow coating quality, thereby allowing the CMC raw material supply chain to reach industrial supply levels.

Figure 2:
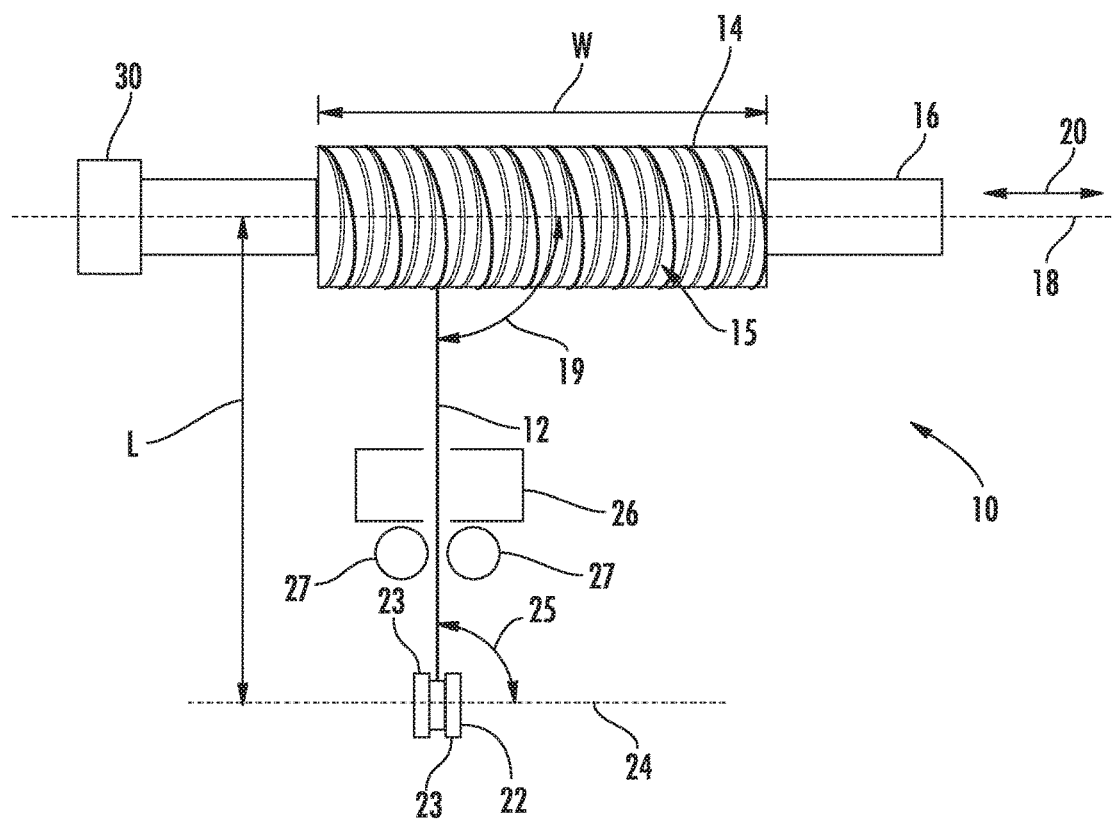
FIG. 2 shows a schematic of a portion of the exemplary unwinding system of FIG. 1 from another angle.

Referring to the drawings, FIG. 1 shows an exemplary unwinding system 10 for unwinding a fiber 12 from a bobbin 14 rotatably mounted around an axle 16. The axle 16 defining a first axis 18 extending an axial direction 20, as shown in FIG. 2, such that the bobbin 14 is rotatable around the first axis 18. Additionally, the bobbin 14 is controllably movable along the axial direction 20 to control the angle of the fiber 12 coming off of the bobbin 14. Consequentially, the angle of the fiber 12 going into the pulley 22 is controlled. As shown, the fiber 12 extends tangentially from a surface 15 of the bobbin 14, and into a pulley 22 positioned to receive the fiber 12 from the bobbin 14. The pulley 22 is rotatable around a second axis 24. In one embodiment, the pulley 22 is in a fixed location along the second axis 24.

As more particularly shown in FIG. 2, a sensor 26 is positioned between the bobbin 14 and the pulley 22. The sensor 26 is configured to determine the position of the fiber 12 with respect to the pulley 22 along at least one point of the length of the fiber 12. As stated, the fiber 12 extends a length from the bobbin 14 to the pulley 22. When a tension is applied on the fiber 12, the fiber length extends tangentially from the surface 15 of the bobbin 14 and tangentially into the pulley 22. Thus, the length of the fiber 12 between the bobbin 14 and the pulley 22 is substantially the same as the length L between the first axis 18 and the second axis 24.

The fiber 12 defines a first angle 19 with the first axis 18 as it is unwound from the surface 15 of the bobbin 14. Similarly, the fiber 12 defines a second angle 25 with the second axis 24 as it is received into the pulley 22. The unwinding system 10 is utilized to move the bobbin 14 along the axial direction 20 of the first axis 18 (e.g., moving the bobbin 14 along the axial direction 20 of the axle 16) such that the first angle and the second angle are kept as close to 90° as possible. For example, each of the first angle 19 and the second angle 25 can be maintained between about 80° to about 100°, such as about 85° to about 95° (e.g., about 88° to about 92°). Thus, any fraying of the fiber 12 is minimized as it enters the pulley 22, since the fiber 12 moves into the pulley such that the fiber 12 avoids contact with the pulley sides 23 and scraping against other fibers as it leaves the surface of the wound bobbin.

Referring again to FIG. 1, the unwinding system 10 is shown encased within a vacuum chamber 5. A pump 102 is fluidly connected to the vacuum chamber so as to adjust the pressure within the vacuum chamber 5. As such, the environment 101 within the vacuum chamber 5 can be controlled as desired. In particular embodiments, the environment 101 within the vacuum chamber 5 can be evacuated to an unwinding pressure of about 1 torr to about 5 torr (e.g., about 2 torr to about 3 torr) during the unwinding process. However, it should be noted that the presently described system can be used in any vacuum level, any pressure, or even in a chemical environment. The presently described system is particularly suitable for such processes due to the space saving design in a chamber.

Controlling of the first angle 19 and the second angle 25 through lateral movement of the bobbin 14 is particularly useful when the length L between the first axis 18 and the second axis 24 is relatively small with respect to the width W of the bobbin 14 (e.g., within a vacuum chamber). Since the fiber is wound around the bobbin 14 along most of its width W, the fiber 12 is unwound from the bobbin 14 from a changing point along its width. The closer the bobbin 14 is to the pulley, the more exaggerated the first angle 19 and the second angle 25 can become, if the bobbin 14 is not moved laterally in the axial direction 20. For example, the length L of the fiber 12 from the bobbin 14 to the pulley 22 can be about 50% to about 1000% of the width of the bobbin 14 along the first axis 18.

In one embodiment, the sensor 26 is a light sensor having a light emitter 28 (e.g., via a LED array) and a receiver 29 (e.g., a camera) that detects the location of the fiber 12 between the bobbin 14 and the pulley 22. The sensor 26 can then generate a signal that is received at a controller 30. The can move the bobbin 14 laterally in the axial direction 20 along the axle 16. The controller 30 is configured to move the bobbin 14 laterally in the axial direction 20 along the first axis 18.

The controller 30 may include a discrete processor and memory unit (not pictured). The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For the embodiment depicted, the instructions include a software package configured to operate the controller 30 to, e.g., execute the exemplary method 400 described below with reference to FIG. 4.

Figure 3:
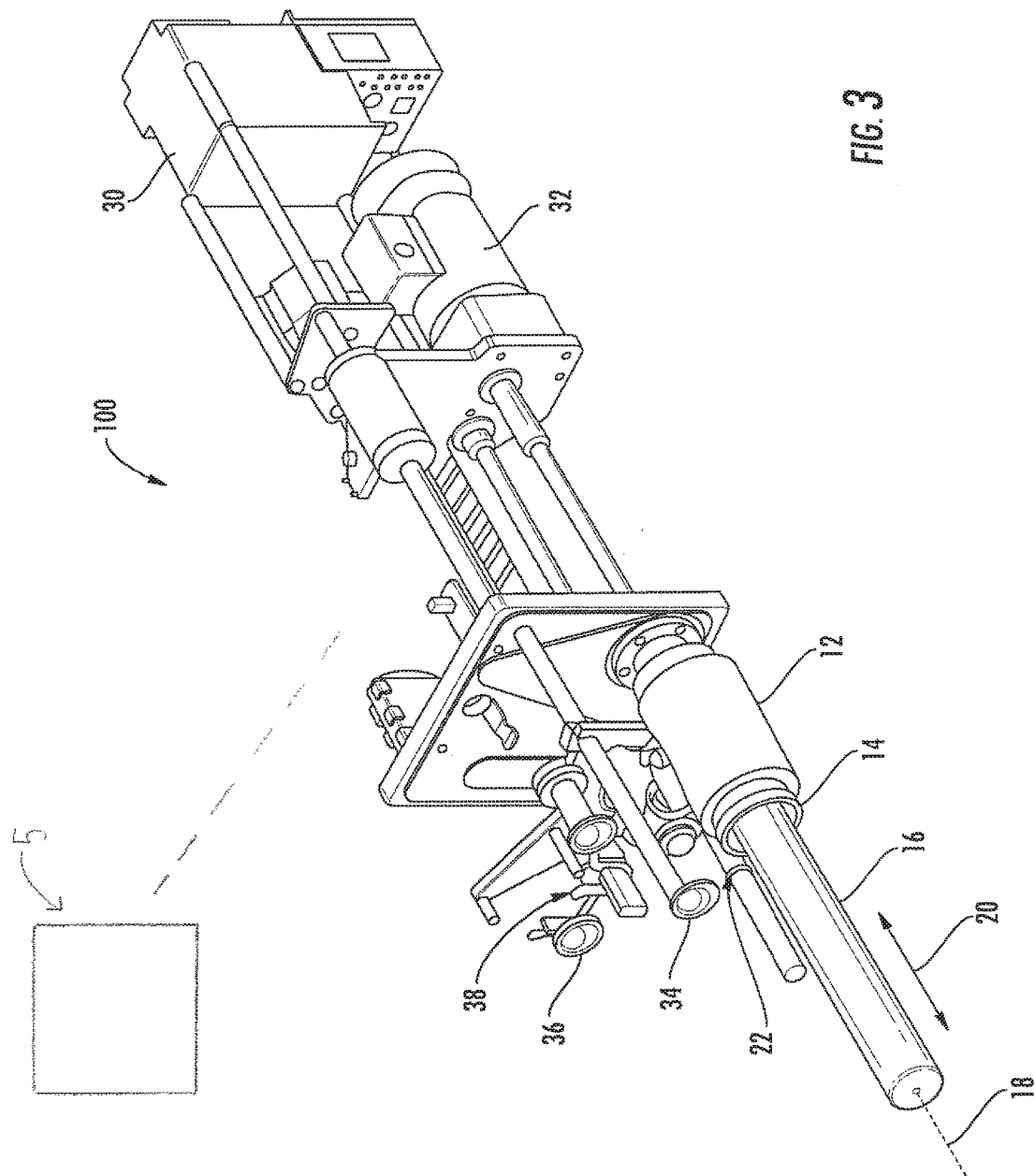
FIG. 3 shows a perspective view of an exemplary bobbin apparatus, such as for use with the exemplary unwinding system of FIG. 1.

Referring now to FIG. 3, an exemplary bobbin apparatus 100 is generally shown that may be utilized with the unwinding system 10. The bobbin apparatus 100 includes the bobbin 14, the controller 30, and a motor 32 attached to the bobbin 14 and configured to move the bobbin 14 in the axial direction 20. The motor 32 can actuate the bobbin 14 laterally in the axial direction 18 as controlled by the controller 30 in response to real-time signals received at the controller 30 from the sensor 26 regarding the position of the fiber 12 between the bobbin 14 and the pulley 22. The bobbin apparatus 100 may also include a magnetic drive mechanism for moving the bobbin 14 along the first axis 18.

As more particularly shown in FIG. 1, the fiber 12 exits the pulley 22 and is received into an idler pulley 34. Then, the fiber 12 can be received from the idler pulley 34 into a dancer pulley 36 that can be connected to a tension controller 38. The tension controller 38 is generally configured to maintain a desired tension on the fiber 12 as it is processed through the unwinding system 10. In certain embodiments, the tension controller 38 senses the load on the dancer pulley 36 (i.e. tension on the fiber) and then responds to change the tension on the fiber 12 by moving the dancer pulley 36 and/or accelerates/decelerates the rotation of the bobbin 14.

The fiber 12 is, in one embodiment, a ceramic fiber such as silicon carbide for forming a fiber reinforced ceramic matrix composites (CMCs). The resulting CMC can be a continuous uniaxial or woven fibers of ceramic material embedded in a ceramic matrix. These materials are designed to have a relatively weak fiber-matrix bond strength compared to the matrix strength so as to increase overall composite strength and toughness. When the CMC is loaded above a stress that initiates cracks in the matrix, the fibers debond from the matrix allowing fiber/matrix sliding without fiber fracture. The fibers can then bridge a matrix crack and transfer load to the surrounding matrix by transferring tensile stresses to frictional interfacial shear forces. Such fiber reinforced CMCs have great potential for use in aircraft and gas turbine engines due to their excellent properties at high temperatures.

Through the exemplary unwinding system 10 described herein, the fibers, usually in the form of long fiber tows, can be unwound from a bobbin (i.e., the fiber source) to begin further processing, such as coating and/or saturating with a slurry of matrix powder in suitable solvents and binders, are then can be wound onto a mandrel to form cylinders or sheets of matrix containing aligned fibers. The impregnated shapes made therefrom are at this stage of the process commonly termed "prepregs." A prepreg can be reshaped as desired and ultimately formed into a preform for a composite article. The preform is subjected to a burn-out step to remove organic or other fugitive coating components. The preform is finally consolidated into a dense composite material by reaction with molten silicon at high temperature.

The fibers are coated for several purposes such as to protect them during composite processing, to modify fiber-matrix interface strength and to promote or prevent mechanical and/or chemical bonding of the fiber and matrix. A number of different techniques have been developed for applying fiber coatings, such as slurry-dipping, sol-gel, sputtering and chemical vapor deposition (CVD). Of these, CVD has been most successful in producing impervious coatings of uniform thickness and controlled composition. In a typical CVD process, fibers and reactants are heated to some elevated temperature where coating precursors decompose and deposit as a coating. CVD coatings can be applied either in a batch or continuous mode. In a batch mode, a length of fiber is introduced into a reactor and kept stationary throughout the coating process while reactants are passed through the reactor. In a continuous process, fibers and coating precursors are continuously passed through a reactor. Continuous fiber coating processes are preferred for composites processed by filament winding. As such, the exemplary unwinding system 10 described herein is particularly suitable for providing a continuous fiber into such a process.

Figure 4:
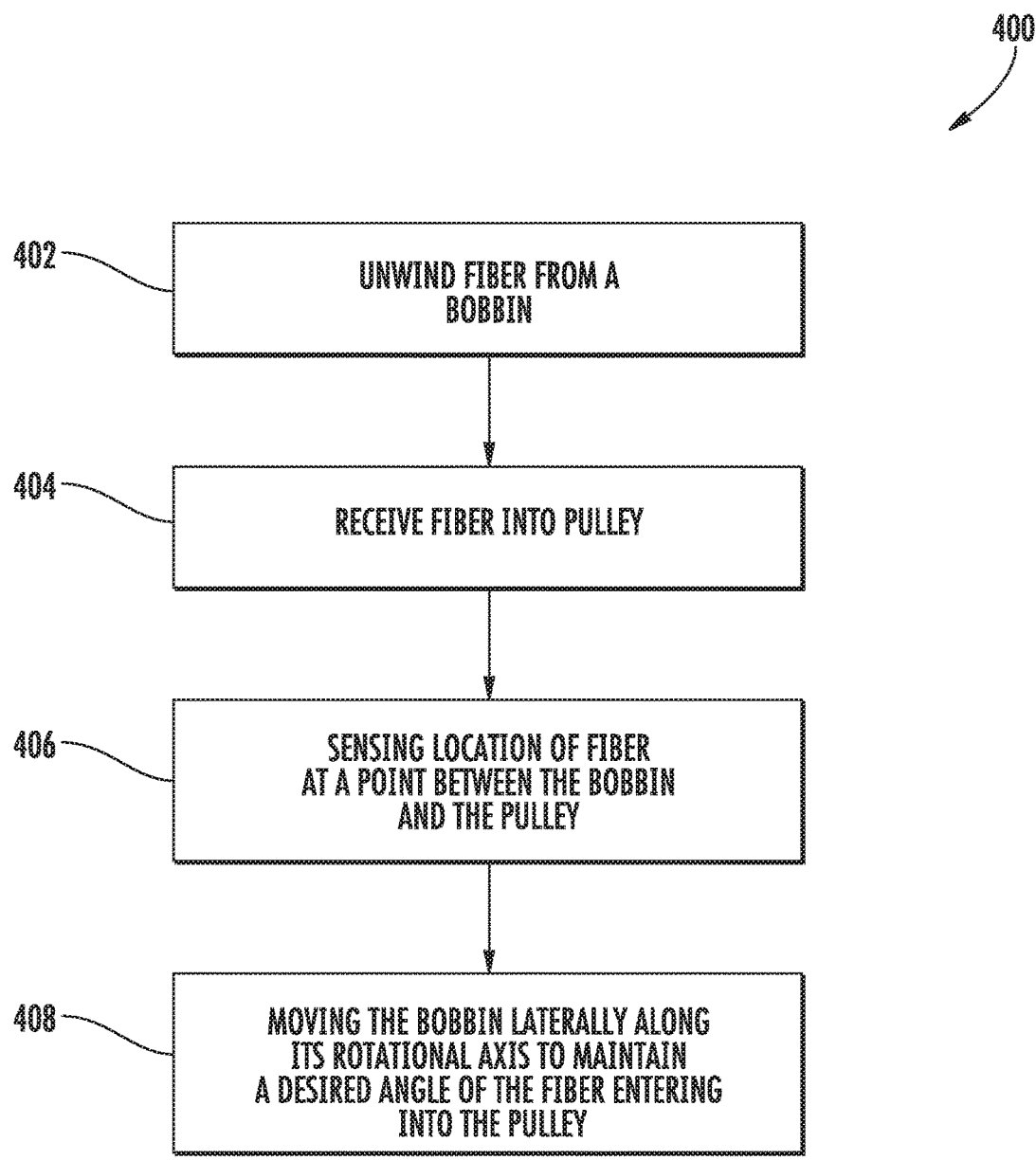
FIG. 4 shows an exemplary method of intelligently unwinding a fiber from a bobbin.

FIG. 4 shows a diagram of exemplary method 400 of intelligently unwinding a fiber from a bobbin. At 402, a fiber is unwound from a bobbin rotating around a first axis extending an axial direction. The fiber is received into a pulley rotatable around a second axis at 404. The fiber extends a length from the bobbin to the pulley, and defines a first angle with the first axis and a second angle with the second axis. At 406, the location of the fiber is sensed along at least one point of the length of the fiber between the bobbin and the pulley. The bobbin is moved laterally (i.e., in the axial direction) along its rotational axis (i.e., the first axis) to maintain a desired angle of the fiber leaving the surface of the wound bobbin (e.g. the first angle) and entering into the pulley (e.g., the second angle). For example, the first angle can be maintained between about 80° to about 100°, such as about 85° to about 95° (e.g., about 88° to about 92°), and the second angle can be maintained between about 80° to about 100°, such as about 85° to about 95° (e.g., about 88° to about 92°).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A unwinding system for unwinding a fiber from a bobbin, the unwinding system comprising:
    an axle defining a first axis extending an axial direction;
    a bobbin rotatably mounted around the axle, wherein the bobbin is moveable along the axial direction, and wherein the fiber extends tangentially from a surface of the bobbin to a pulley positioned to receive the fiber from the bobbin, wherein the pulley is rotatable around a second axis, and wherein the bobbin defines a length along the first axis in the axial direction, and wherein the length of the fiber from the bobbin to the pulley is about 50% to about 1000% of the length of the bobbin along the first axis; and
    a fiber sensor positioned between the bobbin and the pulley,
    wherein the fiber sensor comprises a light sensor having a light emitting diode (LED) array.

2. The unwinding system of claim 1, wherein the fiber sensor further comprises a receiver comprising a camera that detects the location of the fiber between the bobbin and the pulley based on light from the light emitting diode (LED) array, wherein the pulley is in a fixed location along the second axis.

3. The unwinding system of claim 2, wherein the fiber extends from the bobbin to the pulley, and wherein the fiber defines a first angle with the first axis, and further wherein the fiber defines a second angle with the second axis.

4. The unwinding system of claim 3, wherein the fiber sensor determines the position of the fiber with respect to the pulley along at least one point of the length of the fiber.

5. The unwinding system of claim 4, further comprising:
    a controller configured to receive a signal from the fiber sensor, wherein the controller is configured to move the bobbin in the axial direction, and wherein the fiber sensor generates a signal that is received by the controller.

6. The unwinding system of claim 5, wherein the controller is configured to maintain the first angle between about 80° to about 100°.

7. The unwinding system of claim 6 further comprising a motor attached to the bobbin for moving the bobbin in the axial direction, wherein the controller is configured to maintain the first angle between about 85° to about 95°.

8. The unwinding system of claim 5, wherein the controller is configured to maintain the second angle between about 80° to about 100°.

9. The unwinding system of claim 5, wherein the controller is configured to maintain the second angle between about 85° to about 95°.

10. The unwinding system of claim 9, wherein the fiber extends a length extending from the bobbin to the pulley, wherein the fiber sensor is positioned between about 25% to about 75% of the length.

11. The unwinding system of claim 10, wherein the fiber sensor is positioned between about 40% to about 60% of the length.

12. The unwinding system of claim 1, wherein the pulley comprises a roller, and wherein the fiber is received into the pulley at a tangent to the roller.

13. The unwinding system of claim 1, further comprising:
an idler pulley positioned to receive the fiber from the pulley; and
a dancer pulley positioned to receive the fiber from idler pulley.

14. The unwinding system of claim 13, wherein the dancer pulley is configured to control tension of the fiber.

15. The unwinding system of claim 1, further comprising:
at least one idler pulley mounted on a tension sensor that is configured to control the unspooling speed from the bobbin so as to control tension of the fiber.

16. The unwinding system of claim 1 further comprising a vacuum chamber, wherein the axle, the bobbin, the pulley, and the fiber sensor are positioned within the vacuum chamber, and
wherein the vacuum chamber is evacuated to an unwinding pressure of between about 1 torr and about 5 torr.

17. A method for unwinding a fiber from a bobbin, the method comprising:
unwinding a fiber from a bobbin, wherein the bobbin rotates around a first axis extending an axial direction;
receiving the fiber into a pulley rotatable around a second axis, wherein the fiber extends a length from the bobbin to the pulley, and wherein the fiber length defines a first angle with the first axis, and further wherein the fiber length defines a second angle with the second axis, and wherein the bobbin defines a width along the first axis, and wherein the length of the fiber from the bobbin to the pulley is about 50% to about 1000% of the width of the bobbin along the first axis;
sensing a location of the fiber along at least one point of the length of the fiber between the bobbin and the pulley, the sensing a location further comprising a light sensor having a light emitting diode (LED) array; and
moving the bobbin laterally along the axial direction such that the first angle is maintained between about 80° to about 100°.

18. The method of claim 17 further comprising generating a signal that is received at a controller, wherein the pulley is in a fixed location along the second axis, and wherein moving the bobbin laterally along the axial direction maintains the second angle between about 80° to about 100°.

19. The method of claim 17, further comprising placing the bobbin, the pulley, and the light sensor, within a vacuum chamber, and
wherein the vacuum chamber is evacuated to an unwinding pressure of between about 2 torr and about 3 torr.

* * * * *